United States Patent [19]

Wobben et al.

[11] 4,388,330
[45] Jun. 14, 1983

[54] PROCESS FOR THE PREPARATION OF CITRUS JUICE CONTAINING BEVERAGES WITH IMPROVED CLOUD STABILITY

[75] Inventors: Hendrik J. Wobben; Hian-Bie Tan, both of Naarden, Netherlands

[73] Assignee: Naarden International N.V., Naarden-Bussum, Netherlands

[21] Appl. No.: 210,561

[22] Filed: Nov. 26, 1980

[30] Foreign Application Priority Data

Dec. 3, 1979 [NL] Netherlands ............ 7908722

[51] Int. Cl.³ ............................................. A23L 2/02
[52] U.S. Cl. ........................................ 426/51; 426/52; 426/599; 426/330.5
[58] Field of Search ............ 426/51, 599, 52, 63, 426/330.3, 330.5

[56] References Cited

U.S. PATENT DOCUMENTS

| | | | |
|---|---|---|---|
| 1,338,684 | 5/1920 | Dunlap et al. | 426/51 |
| 2,680,688 | 6/1954 | Moulton | 426/51 |
| 3,711,294 | 1/1973 | Atkins et al. | 426/599 |
| 3,754,932 | 8/1973 | Baker et al. | 426/51 |
| 4,032,663 | 6/1977 | Kobayashi et al. | 426/51 |
| 4,275,648 | 6/1981 | Mouri et al. | 426/51 |

FOREIGN PATENT DOCUMENTS

| | | |
|---|---|---|
| 40313 | 3/1937 | Netherlands . |
| 7414832 | 5/1975 | Netherlands . |
| 437852 | 11/1935 | United Kingdom . |

OTHER PUBLICATIONS

S. Bruin et al., CONSERVA, vol. 15, 1967, pp. 237–240, for "Depectineren van Zwartebessensap met Behulp van een Proteolytisch Enzym".

*Primary Examiner*—Raymond N. Jones
*Attorney, Agent, or Firm*—Brumbaugh, Graves, Donohue & Raymond

[57] ABSTRACT

The cloud stability of citrus juice beverages and beverage bases is improved by subjecting pasteurized concentrated or single strength citrus juice to at least one enzyme having protease activity. The further step of pretreating the starting material mechanically or enzymatically to make it more accessible to protease activity prior to or simultaneously with treatment with at least one enzyme having protease activity is also within the invention.

12 Claims, No Drawings

PROCESS FOR THE PREPARATION OF CITRUS JUICE CONTAINING BEVERAGES WITH IMPROVED CLOUD STABILITY

The invention relates to a process for improving the cloud stability of citrus juice containing soft drinks, and to a process for the preparation of materials used in the manufacture of such soft drinks such as concentrated citrus juices and soft drink concentrates. The invention also comprises soft drinks and materials used in their manufacture when prepared according to the process of the invention.

Citrus juice containing beverages form an important category of soft drinks. The main representatives of this category are carbonated lemon and orange drinks. They contain a suspension of very finely dispersed, water insoluble fruit particles, giving the drink a cloudy appearance. To the consumer this cloud is an essential aspect of these drinks. However, the cloud particles tend to coagulate and settle. This precipitate gradually changes into a compact mass which cannot easily be redispersed. It gives the drink an unsavoury appearance and is unacceptable to the consumer.

Generally, citrus juice is produced within the vicinity of the growing area. This production includes squeezing, straining, centrifuging, pasteurizing and concentrating, and yields a citrus juice concentrate (hereinafter called "concentrate") with a soluble solids content of between 40° and 68° Brix. This concentrate is shipped to various parts of the world, where it is further processed into a stabilized and compounded soft drink concentrate, also known in the art as "flavoured juice", but hereinafter called "soft drink compound" or "compound". This compound is converted into a ready to drink beverage by the addition of a suitable amount of a sweetening agent such as sucrose, high fructose syrup or an artificial sweetener, some citric acid if desired and—mostly carbonated—water. The preparation of the compound includes provisions to keep the cloud particles evenly dispersed in the ready to drink beverage. These provisions comprise the addition of soluble gums or thickening agents like pectin, propylene glycol alginate, sodium alginate, tragacanth, carragenan, guar gum, gum arabic, carboxymethyl cellulose, locust bean gum etc. Moreover, after the addition of the various components to the compound it is usual to subject it to high pressure homogenization.

Together these provisions will make the cloud stay dispersed in the drink for about one month. However, there is a need in the art for a process which will produce a drink with an increased cloud stability.

Therefore, the composition of the cloud particles in citrus juice, and the factors influencing cloud stability have been the subject of much research effort. It was established that the cloud particles mainly consist of cellular debris (pulp), hesperidine crystals and small droplets of essential oil. The cellular debris predominantly consists of cellulose-, hemicellulose- and pectin-like material and also contains protein. Cloud stability was found to be strongly influenced by the nature of dissolved pectins, especially by the ratio of ester groups to free acid groups and by the chain length. In the past, attempts have been made to influence cloud stability by treating the juice with various enzymes. Generally, the action of pectin esterase turned out to decrease cloud stability. Therefore, citrus juice is usually pasteurized shortly after squeezing to destroy the pectin esterase which is naturally present.

R. H. Biggs and J. E. Pollard, Fla. State Hort. Soc. 1970, 314–18, investigated the influence of cellulase, lipase, pectinesterase, pectinase, protease and ribonuclease on cloud stability of freshly squeezed, unpasteurized orange juice. They found the action of all these enzymes to decrease cloud stability.

J. J. P. Krop and W. Pilnik, Lebensm. Wiss. u Technol. 7 (1974) no. 2, 125–126, investigated the influence of various proteases on the cloud stability of single strength orange juice, obtained by proper dilution of juice concentrate. Certain types of protease were found not to affect cloud stability, while others were found to decrease the cloud stability.

R. A. Baker and J. H. Bruemmer, Fla. State Hort. Soc. 1971, 197–200, reported that the simultaneous action of pectinase and protease on fresh squeezed juice, followed by pasteurization, has a positive effect on cloud stability, whereas the action of the same enzyme mixture after pasteurization leads to a strong decrease.

In German Patent application no. 2.746.884, laid open to public inspection, a method is described to obtain stable cloudy citrus juices by allowing part of the original cloud to settle after a treatment with pectinase. However, this method is suitable only for juices with pH below 2.5. Moreover, the method causes a great deal of the cloud to be lost, which is particularly a disadvantage when the juice is to be processed into a cloudy soft drink. Thus, the known state of the art necessarily leads to the conclusion that protease treatment of pasteurized single strength citrus juice at best has no influence on cloud stability, but more probably will lead to a decrease.

Nothing at all is known about the effect of a protease treatment of citrus juice on the cloud stability in beverages which only partly consist of citrus juice, such as juice containing carbonated or still soft drinks, but extrapolation from the published results on single strength juice does not give much hope for these drinks either.

However, it was surprisingly found, that the cloud stability of citrus juice containing soft drinks and soft drink compounds can be substantially improved by treating pasteurized, concentrated or single strength citrus juice with enzymes with protease activity. After this treatment a juice concentrate, soft drink compound or soft drink may be prepared from the treated juice according to usual procedures.

The term "citrus juice containing soft drink" is used here to mean a beverage containing up to 60% citrus juice. Examples of such beverages are fruit nectars with a juice content of up to 50% and fruit drinks with a much lower juice content. The actual juice content may vary from country to country according to various food laws and regulations. The stability improvement obtained according to the invention is especially important for the latter type of drinks.

The protease treatment may be effected at any stage after the pasteurization of the freshly squeezed juice, that is prior to or after the conversion into juice concentrate. Preferably the concentrate is subjected to the treatment. Therefore the invention also comprises citrus juice concentrates which have been subjected to a treatment with proteolytic enzymes. It may be advantageous to slightly dilute very highly concentrated juices to lower the viscosity and thereby facilitate the mixing with the enzyme preparation. It is also possible to carry out the enzyme treatment during or after processing the juice concentrate into compound.

The stability improvement depends on the degree of protein hydrolysis in the juice. At high hydrolysis ratios (75-95%) the period of cloud stability may be extended by several months, but also much lower hydrolysis ratios will yield a substantial stability improvement. Moreover, the protein hydrolysis does not affect the flavor of the beverages prepared from treated juice. The well known bitter taste of lower peptides was not noticeable.

The process according to the invention is generally applicable to citrus juices and juice concentrates, such as orange juice and lemon juice. It is especially suitable for orange juice or concentrate.

Suitable protease may be of vegetable, animal or microbial origin. Obviously, they must be sufficiently active in the acidic medium of the juice. Examples of suitable enzymes are bromelain, ficin and papain of vegetable origin; pepsin and rennin of animal origin and enzymes derived therefrom e.g. Aspergillus oryzae. If desired, immobilized enzymes may be used. When treating a relatively weakly acidic juice, such as orange juice, with an enzyme preparation having a very low optimum pH, it may be advantageous to add a suitable amount of some food grade acid, e.g. the whole or part of the amount of ctiric acid which is normally added in the manufacture of the ready to drink beverage. If food laws or regulations require this acid to be of natural origin, it may be added as lemon juice, which thus is also subjected to the stabilizing treatment according to the invention.

The protein hydrolysis may be carried out using a single enzyme or a combination of enzymes or enzyme preparations either consecutively or simultaneously. The choice of the reaction conditions is subject to limitations caused by the limited heat stability of citrus juice. Therefore, the reaction temperature should preferably not exceed 85° C. On the other hand, at temperatures below about 30° C. the reaction proceeds too slowly to be of any use. Generally, temperatures between 30° and 80° C. are especially suitable.

The required protease concentration is not critical. In practice enzyme concentration, reaction temperature, reaction time and type of enzyme are mutually adjusted and tuned to the desired hydrolysis ratio. Preferably a protease activity of between 0.001 and 20 Anson Units per kg single strength juice is used. Addition of more protease will reduce its efficiency.

Using the protease activity mentioned above and a temperature between 30° and 85° C. the treatment will be completed in 0.1-50 hours, yielding a hydrolysis ratio of between 50 and 95%. Lower hydrolysis ratios, but still sufficient to obtain a useful stability increase may even be obtained using reaction times as short as 1 min at a temperature of 65° C. or higher. The attainable hydrolysis ratio is slightly dependent on the characteristics of the starting material: juices with a relatively high content of peel constituents generally give a lower hydrolysis ratio.

The hydrolysis ratio p is defined as:

$$p = \frac{a - b}{a} \times 100\%,$$

wherein a refers to the content of protein which can be precipitated from the juice with trichloroacetic acid prior to the treatment with protease and b refers to this protein content after the treatment. Both are calculated as $N \times 6.25$ wherein N is the nitrogen content of the precipitate.

The action of one or more proteases may be preceded by, or combined with a treatment to make the protein more easily accessible to protease, hereinafter called the "pretreatment." Thereby it is possible to considerably shorten the reaction time needed to obtain a certain hydrolysis ratio, or reach a much higher hydrolysis ratio within a certain time. The pretreatment may comprise a hydrolytic decomposition of the pulp using enzymes with cellulase and/or hemicellulase activity, hereinafter called "enzymatic pretreatment". Alternatively the pretreatment may comprise a mechanical reduction of the pulp particle size, hereinafter called "mechanical pretreatment". These methods of pretreatment may also be used together and may either precede or be wholly or partly combined with the protease treatment. Thus, it is possible to have a mechanical pretreatment precede a simultaneous enzymatic pretreatment and protease treatment.

Obviously, the enzymes with cellulase and/or hemicellulase activity should be sufficiently active in the acidic medium of the juice. The temperature of the enzymatic pretreatment is not critical, however, as outlined above, the limited heat stability of citrus juice should be taken into account. Generally an enzyme activity of up to 30.000 cellulase units (CU) and/or hemicellulase units (HU) per kg single strength juice in the pretreatment will be sufficient to enable a thorough and rapid protease treatment.

Most commercially available cellulase and hemicellulase preparations also have some pectinase activity and thus may cause some pectin decomposition, leading to a decrease in cloud stability. This decrease may partly or wholly cancel the stability increase obtained by the protease treatment. This disadvantage may be removed by supplying an extra amount of the gums, especially pectin, when manufacturing the compound.

The mechanical pretreatment may be effected using colloid mills, homogenizers and similar equipment. Often, the mechanical pretreatment in itself gives an improved cloud stability. This is an added advantage on top of the stability improvement derived from the protein hydrolysis.

Cellulase or hemicellulase used for the enzymatic pretreatment must thereafter be inactivated to prevent it from attacking gums and thickening agents added during the manufacture of the compound. Therefore the juice is subjected for a short time to a high temperature, e.g. 5 minutes at 90°-95° C. which also inactivates the protease. However, since there is no need for the protease to be inactivated, the heating can be omitted if the juice has not been subjected to a cellulase or hemicellulase treatment.

Citrus juice or concentrate treated according to the invention may be processed in the usual way into a soft drink. Preferably it is first processed into a soft drink compound to be used in the soft drink industry. This processing may comprise the addition of gums or thickening agents and citrus essential oils, homogenization and pasteurization and/or the addition of a preservative to prevent microbial spoilage. Apart from the pasteurization step the production of soft drink compounds usually takes place at room temperature. Since cellulase and hemicellulase show little activity at room temperature, inactivating of these enzymes may be postponed until after the manufacture of the compound and then combined with the pasteurization step.

As indicated above, the manufacture of the soft drink compound may be combined with the protease treatment if desired. Thus a simple way of using the process of the invention comprises the addition of protease prior to, or during the manufacture of the compound. In that case the usual homogenization step also accomplishes the mechanical pretreatment to render the protein more accessible to hydrolysis. Subsequently the compound is pasteurized at a temperature above 65° C. and during the pasteurization the protease hydrolyses the protein.

Other ways and means for performing the process according to the invention are illustrated in the examples.

The units of enzyme activity mentioned above are defined as follows:

Protease activity

1 Anson Unit (AU) is the amount of enzyme which at its optimum pH liberates 1 mmol Folin-positive aminoacids—calculated as tyrosine—per minute from hemoglobin.

Cellulase activity

A solution of 938 mg carboxymethyl cellulose (70C high of Hercules) in 500 ml water is treated with w g cellulase preparation at 40° C. and pH 4.4. The change in viscosity is measured as a function of the reaction time by means of an Ostwald-Cannon-Fenske viscometer. The activity in cellulase units (CU) per g enzyme preparation follows from:

$$\text{activity} = \frac{F_{10} - F_5}{w} \, CU/g,$$

wherein $F_{10}$ and $F_5$ are the relative reciprocal viscosities after 10 and 5 minutes respectively. The relative reciprocal viscosity $F_t$ at time t is defined by:

$$F_t = \frac{Ti - Tw}{T_t - Tw}$$

wherein Tw is the rate of flow of water, Ti is the rate of flow of the substrate solution before the treatment with enzyme and $T_t$ is the rate of flow of the substrate solution after treatment with the enzyme for t minutes.

Hemicellulase activity

The hemicellulase activity of an enzyme preparation is defined as described above for cellulase activity, provided that a 0.2% locust bean gum solution is used as the substrate at 40° C. and pH 4.5:

$$\text{activity} = \frac{F_{10} - F_5}{w} \, HU/g,$$

wherein $F_{10}$, $F_5$ and w are as indicated above.

EXAMPLE I

A soft drink compound was prepared according to the following method using orange juice concentrate obtained from Pera oranges by the "FMC" squeezing process:

| | |
|---|---|
| Juice concentrate, 53° Brix | 8.55 kg |
| Locust bean gum solution, 1% by weight in water | 0.60 kg |

-continued

| | |
|---|---|
| High methylated pectin, 5% by weight solution in water | 0.60 kg |
| Orange oil | 0.07 kg |
| Sodium benzoate, 25% by weight solution in water | 0.02 kg |
| Water | 0.16 kg |
| | 10.00 kg. |

The juice concentrate and the locust bean gum and pectin solutions were combined and stirred to a homogeneous mixture. The other components were added and the soft drink compound so obtained was homogenized once at 15 MPa.

From this compound a so called "bottling syrup" was prepared according to the following method:

| | |
|---|---|
| Soft drink compound | 1.45 kg |
| Sodium benzoate, 25% by weight solution in water | 0.02 l |
| Liquid sugar (67% by weight sucrose) | 7.00 l |
| Citric acid, 50% by weight solution in water | 0.15 l |
| make up with water to | 10.00 l. |

60 l of an orange drink containing 10% by weight of orange juice was prepared by diluting 10 l of this bottling syrup with 50 l of carbonated water. The cloud stability of this drink was judged visually after 1, 3, 6 and 10 weeks.

EXAMPLE II

A 65°Brix juice concentrate obtained from Pera oranges by the "FMC" squeezing process was diluted with water to 53°Brix. 0.3% by weight of pepsin (equivalent to about 2.2 AU per kg single strength [10°Brix] juice) was added to the concentrate. The mixture was heated to 50° C. and kept at that temperature for 1 hour. A protein hydrolysis ratio of 62% was obtained. Subsequently this protease treated concentrate was converted into an orange drink containing 10% juice and its stability judged visually as described in example I.

EXAMPLE III

A 65°Brix juice concentrate obtained from Pera oranges by the "FMC" squeezing process was diluted to 53°Brix. 0.3% by weight of pepsin was added to the concentrate. The mixture was heated to 50° C. and kept at that temperature for 30 minutes. Subsequently, it was rapidly heated to 90° C. for 5 minutes. After cooling to 50° C. 0.3% by weight of *Boerozym PN was added and the mixture kept at 50° C. for another 30 minutes. Thereafter the protein hydrolysis ratio was 67%. The protease treated concentrate was converted into an orange drink as described in example I.

* Boerozym PN is a papain preparation marketed by C. H. Boehringer Sohn, Ingelheim am Rhein, F.R.G.

EXAMPLE IV

A 65°Brix juice concentrate obtained from Valencia oranges by the "Brown" squeezing process was diluted to 53°Brix. 0.1% by weight of **Hemicellulase CE-100 and 0.1% by weight of pepsin (equivalent to about 1000 HU and 0.7 AU per kg single strength juice) was added to the concentrate. The mixture was stored for 48 hours at 40° C. and subsequently heated to 95° C. for 5 minutes to destroy the enzymes. A protein hydrolysis ratio of 69% was obtained. The enzyme treated concentrate was converted into an orange drink which was visually judged as described in example I.

** Hemicellulase CE-100 is marketed by Miles Laboratories Inc., Elkhart, Indiana, U.S.A.

EXAMPLE V

A 65°Brix juice concentrate from Pera oranges, obtained by the "FMC" squeezing process was homogenized with a Rannie homogenizer at 15 MPa, and subsequently diluted to 53°Brix. 0.3% by weight of pepsin was added and the mixture heated to 75° C. for 20 minutes, yielding a protein hydrolysis ratio of 60%. The treated concentrate was further processed into an orange drink and judged as described in example I.

EXAMPLE VI

A 65°Brix juice concentrate from Valencia oranges, obtained by the "Brown" squeezing process was homogenized at 15 MPa with a Rannie homogenizer and thereafter diluted to 53°Brix. The concentrate was treated with pepsin and Boerozym PN as described in example III. A protein hydrolysis ratio of 88% was obtained. An orange drink was prepared from this concentrate and judged as described in example I. The results are given in the table below.

EXAMPLE VII

A 65°Brix juice concentrate from Pera oranges, obtained by the "FMC" squeezing process was milled with a Fryma mill and thereafter diluted to 53°Brix. The concentrate was treated with pepsin and Boerozym PN as described in example III and a protein hydrolysis ratio of 90% obtained. An orange drink was prepared from this concentrate and judged as described in example I. The results are given in the table below.

Results of cloud stability judgements

| Example | protein hydrolysis ratio | precipitate after: | | | |
|---|---|---|---|---|---|
| | | 1 week | 3 weeks | 6 weeks | 10 weeks |
| I | — | ooo | oooo | ooooo | ooooo |
| II | 62% | o | oo | ooo | oooo |
| III | 67% | o | oo | ooo | oooo |
| IV | 69% | o | oo | ooo | oooo |
| V | 60% | o | oo | ooo | oooo |
| VI | 88% | — | o | o | o |
| VII | 90% | — | o | o | o |
| VIII (lem.) | — | oo | ooo | oooo | oooo |
| IX (lem.) | 40% | o | oo | ooo | ooo | rating
— no precipitate
o very little precipitate
oo little precipitate
ooo moderate precipitate
oooo substantial but yet acceptable precipitate
ooooo heavy and unacceptable precipitate.

EXAMPLE VIII

A soft drink compound was prepared according to the following method, using lemon juice concentrate:

| | |
|---|---|
| Juice concentrate, 42° Brix | 7.77 kg |
| Locust bean gum, 1% by weight solution in water | 0.40 kg |
| High methylated pectin, 5% by weight solution in water | 0.48 kg |
| Lemon oil | 0.05 kg |
| Ascorbic acid | 0.016 kg |
| Citric acid, 50% by weight solution in water | 0.02 kg |
| Sodium benzoate, 25% by weight solution in water | 0.02 kg |
| make up with water to | 10.00 kg |

The juice concentrate and the locust bean gum and pectin solutions were combined and stirred to a homogeneous solution. The other components were added and the soft drink compound so obtained was homogenized once at 15 MPa. From this compound a so called "bottling syrup" was prepared according to the following method:

| | |
|---|---|
| Soft drink compound | 1.65 kg |
| Sodium benzoate, 25% by weight solution in water | 0.013 l |
| Liquid sugar | 9.32 kg |
| Citric acid, 50% by weight solution in water | 0.200 l |
| make up with water to | 10.00 l. |

60 l of lemon drink containing 10% by weight of lemon juice was prepared by dilution of 10 l of this bottling syrup with 50 l of water containing 1.5 g of carbon dioxide per l. This drink was judged visually as described above.

EXAMPLE IX

A 42°Brix lemon juice concentrate was homogenized at 15 MPa with a Rannie homogenizer. The mixture was heated to 50° C. 0.3% by weight of pepsin was added and the mixture kept at 50° C. for 30 minutes. Subsequently it was heated to 90° C. for 5 minutes and cooled again to 50° C. 0.3% by weight of Boerozym PN was added and the mixture kept at 50° C. for another 30 minutes. A protein hydrolysis ratio of 40% was obtained. Subsequently this protease treated concentrate was converted into a lemon drink as described in example VIII.

We claim:

1. A process for preparing citrus juice products for use in soft drinks and other beverages, which comprises the step of treating juice selected from the group consisting of pasteurized concentrated citrus juice and pasteurized single strength citrus juice with one or more protease enzymes for a time and under conditions sufficient to improve cloud stability when the juice is subsequently employed in soft drinks and other citrus juice containing beverages.

2. A process according to claim 1, which comprises the step of treating the juice for at least one minute with at least one protease enzyme at a temperature of 30°-85° C.

3. A process according to claim 2, wherein the protease activity of the enzyme is 0.001-20 Anson Units per kg single strength juice.

4. A process according to claim 1, wherein prior to or simultaneously with the enzyme treatment, the juice is mechanically or enzymatically pretreated to render the citrus juice more responsive to protease activity.

5. A process according to claim 4, wherein the juice is pretreated with cellulase or hemicellulase.

6. A process according to claim 5, wherein cellulase or hemiceullulase is used at a concentration of at most 30,000 cellulase units and/or hemicellulase units per kg single strength juice.

7. A process according to claim 4, wherein homogenization is used as the pretreatment.

8. A process for preparing citrus juice containing soft drinks which comprises the step of treating juice selected from the group consisting of pasteurized concentrated citrus juice and pasteurized single strength citrus juice with one or more protease enzymes for a time and under conditions sufficient to improve cloud stability when the juice is subsequently employed in a soft drink and using up to about 60% of the enzyme-treated citrus juice to prepare a soft drink.

9. A process according to claim 8, wherein the enzyme treatment and the addition to the soft drink are carried out simultaneously.

10. A citrus juice containing soft drink prepared according to the process of claims 8 or 9.

11. A citrus juice product for use in soft drinks and other beverages prepared according to the process of claim 1.

12. A process according to claim 1 or 8, wherein the citrus juice is orange juice.

* * * * *